Nov. 30, 1926.

O. M. TUCKER ET AL
SPOUT APERTURE BUSHING
Filed Nov. 11, 1924

Oliver M. Tucker
William A. Reeves INVENTOR.

BY
ATTORNEYS.

Nov. 30, 1926.

O. M. TUCKER ET AL 1,608,967

SPOUT APERTURE BUSHING

Filed Nov. 11, 1924    2 Sheets-Sheet 2

Oliver M. Tucker
William A. Reeves INVENTOR.

BY
ATTORNEYS.

Patented Nov. 30, 1926.

1,608,967

UNITED STATES PATENT OFFICE.

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE.

SPOUT-APERTURE BUSHING.

Original application filed September 23, 1918, Serial No. 255,349, now Patent No. 1,519,885. Divided and this application filed November 11, 1924. Serial No. 749,316.

Our invention relates to spout aperture bushings. It aims to provide a novel form of bushing which constitutes a delivery orifice for spouts and which is readily applicable to a permanent spout aperture by such a method that a gas-tight and glass-tight joint will result. Then, it aims to provide a method of application which will ensure this tight joint and yet permit of the ready separation necessary for the frequent replacements demanded. The bushing itself has certain novel characteristics but of equal importance is the method of application.

Our invention, furthermore, aims to provide a novel device for holding the aperture bushing, which device permits proper adjustment of the joint betwen the spout aperture and the bushing, and which device receives and holds the bushing in such a way as to prevent breaking or falling apart of the bushing, should the bushing become cracked or split during use. This device for holding the aperture bushing is shown and described in connection with a spout having orifice bushings of the type adapted for frequent replacement, and our invention further contemplates a bushing and retainer structure which shall be adapted to be removed from the spout outlet when it is desired to replace the bushing for any reason.

This case is a division of applicants' copending application No. 255,349, filed September 23, 1918, on which Patent No. 1,519,885 was issued December 16, 1924, interchangeable spout aperture bushings and a method of applying the same.

Our invention is peculiarly adapted to use in apparatus for producing preformed charges of viscous glass, that is, charges whose cross-sections are to be fixed by extrusion through the bushings in question. With this in view and with an understanding of the difficulties attendant upon the flowing of glass at a high temperature, it will be understood that bushings must be frequently changed.

All the workers in the art appreciate the difficulties which arise from the almost irresistible tendency of hot viscous glass to seep into any joint or crack with which it comes into contact. When this occurs, the abutting surfaces are so cemented that, if they are clay, one or the other will break in separating. Then, when it is understood that we intermittently support the glass between successive extrusions by an enclosed gas burning under pressure it will appear that we are also faced with the neccessity of having a gas-tight as well as a glass-tight joint which joint, however, must be readily breakable without destruction of abutting surfaces.

The preferred embodiment of our invention is shown in the accompanying drawings wherein similar characters of reference designate corresponding parts and wherein.

Figure 2:
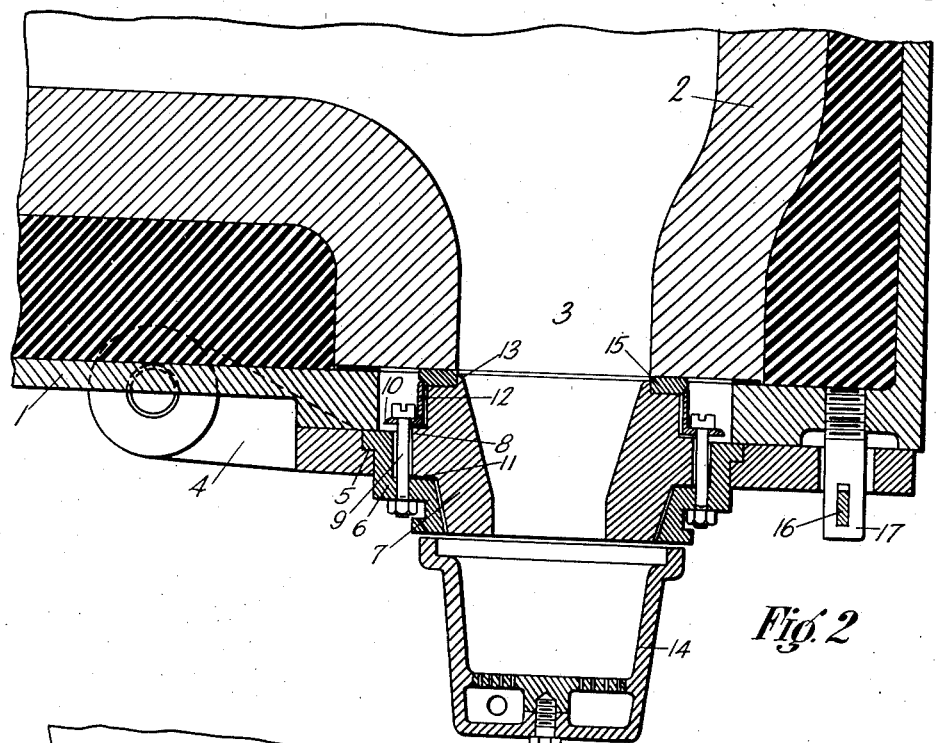
Figure 2 is a section similar to section shown in Figure 1, showing the bushing in operative position.

In the drawings, the spout is shown at 1 as having a spout block 2 with a delivery orifice 3 therein. Mounted on spout 1 is a hinged member 4 having a shouldered aperture as at 5, within which aperture is supported a bushing container 6 embodying our invention. The hinged member may swing into or out of operative position in the manner shown in the drawings.

The bushing container 6 is socketed in its upper face to receive a clay bushing 7, which bushing is provided with a shoulder 8 clamped to the socket member 6 by means of bolts 9 and ring 10 and having a gas-tight asbestos packing at 11. The clay bushing 7 is provided with a hole of a form to impart any chosen cross-section to viscous glass extruded therethrough and, since this proper cross-section must always be attainable, or for other reasons the bushing must be changed from time to time, it is necessary that the bushing be readily removable. It will be understood that the ring 10 is flexible to accommodate itself to inequalities and it will be noted that it has an upwardly extending flange 12 cooperating with a ridge 13 on the bushing top to produce a channel effect.

The preformed glass charges are produced by intermittent extrusion through the bushing, extrusion being prevented intermittently by the capping of the delivery orifice with a cup 14 to which gas is fed and burned under pressure.

Experience has demonstrated that, at the joint between the clay bushing 7 and the spout block 2, the glass has an almost irresistible tendency to seep in and cement the abutting surfaces of these elements together. Thus, when an attempt is made to separate the bushing 7 from the spout block 2, these elements adhere so tightly that they cannot separate without breaking one or the other. Likewise, the gas of the cup may force the glass upwardly so as to bare the joint to such gases, whereby the gases may escape, which is undesirable.

We have solved this difficulty, however, by the use of a ring of soft clay 15 which is first placed upon the upper irregular surface of the bushing 7 and which thereafter is compressed between the spout block and the bushing 7 when such bushing is moved into its proper position, as in Figure 2.

The clay used for this ring 15 is not only soft but it is of such a size and nature that, under the temperature that strikes it, it will not burn to anything like the degree of hardness attained by the elements which it separates and joins.

The device is simple but of utmost importance. The clay ring effectually seals the joint in question against either gas or viscous glass and yet the bushing can be readily removed by merely swinging the member 4 downward. Ordinarily, the clay ring breaks away from the spout block 2, adhering to the upper face of the bushing 7. This is probably due to the increased surface area with which it contacts on such bushing. The soft clay may be so compressed that a portion will extend through into the downward path of the glass, but this can be remedied by merely cutting off superfluous clay. The device is simple but obviously efficient.

Figure 1:
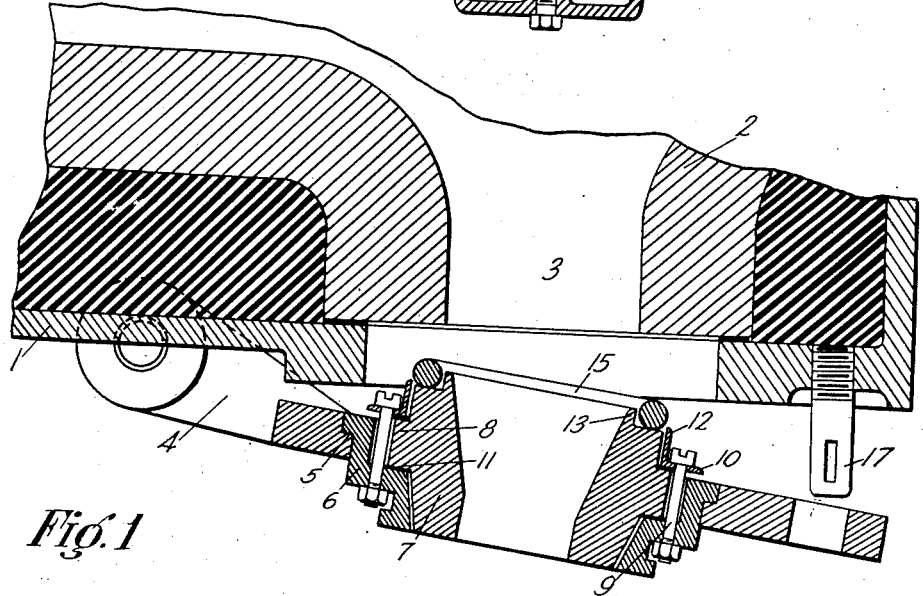
Figure 1 is a transverse longitudinal section of our improved bushing, with its novel sealing means, ready to be moved into operative position.
Figure 3:
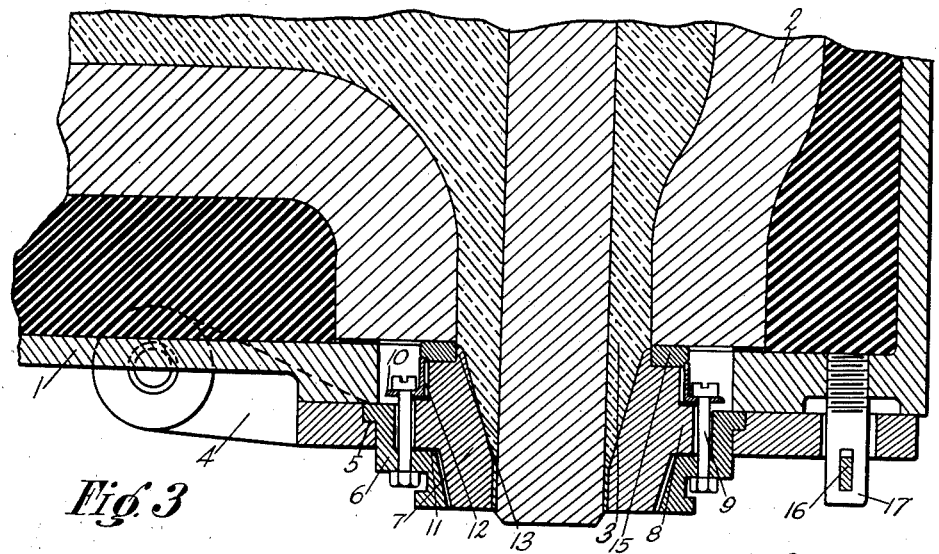
Figure 3 is a vertical longitudinal section showing our method of stopping the delivery of the glass from the orifice 2.
Figure 4:
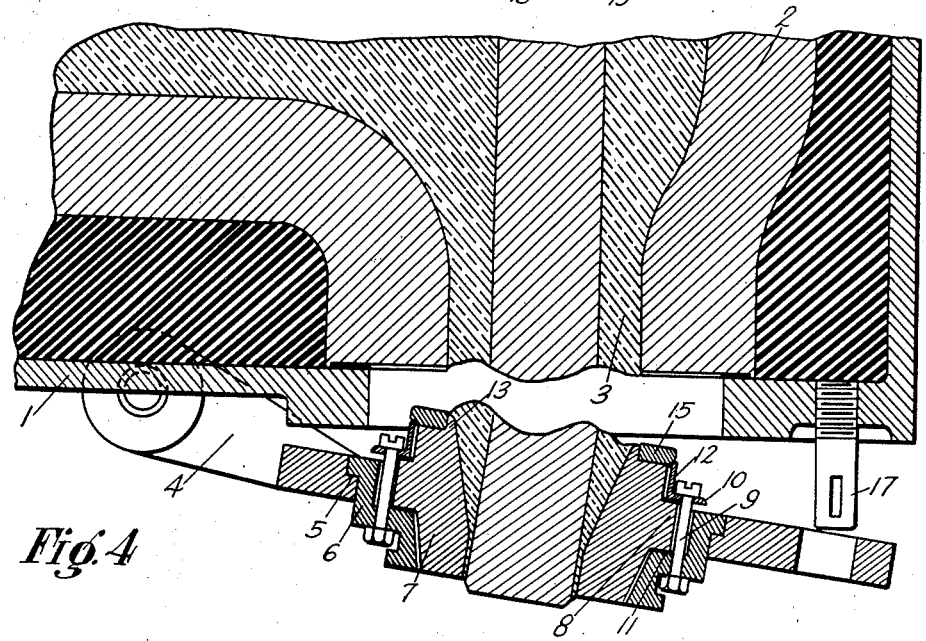
Figure 4 is a section similar to section 3 showing the bushing broken away from the spout block preparatory to complete removal from its supporting structure.

In operation, when it is desired to change a bushing, we preferably force a sand core into the delivery orifice, as shown in Figure 3. Then, after the glass has cooled, adjacent the bushing, we release the hinged member and swing it down, breaking off the sand core and the surrounding glass in the bushing. Then, we remove the member 6 and substitute a new bushing for the one contained therein. When we have placed the member 6 carrying the new bushing in the hinged member, we superimpose thereon a soft clay ring as shown in Figure 1. Then, the hinged member is swung upwardly until the clay ring is tightly compressed as shown in Figure 2. The hinged member is fastened in position by a wedge 16 extending through a bolt 17. If necessary, the interior upper edge of the bushing may be scraped to remove excess clay.

It is important to note that we have devised apparatus whereby a bushing may be changed in an extremely short period of time. With our device, a sand core may be inserted into the bushing and into the glass thereabove and when the glass has sufficiently chilled in the outlet, the bushing is pulled away from the outlet walls by the downward swinging movement of the hingedly mounted holder. When this happens, the sand core will simply be broken off together with the glass within the bushing. It is also important to note that it is not necessary and in the large majority of cases not desirable to permit the main body of glass in the spout to chill. The chilling and hardening of the glass need only occur for a very slight distance above the joint between the bushing and the spout block. All practical glass workers will appreciate the importance of this great saving of time.

Having thus described our invention, what we claim is:

1. In combination with a spout having a delivery orifice therein, a bushing with a ridge on its inner and upper edge, and an abutting element extending above the outer and upper edge of said bushing and coacting with said ridge to retain a ring of filling material.

2. In combination with a spout having a delivery aperture therein, and a bushing, said bushing having a channel formation on its upper edge for the retention of a ring of filling material.

3. In combination with a spout for delivering viscous glass, a bushing which constitutes a delivery orifice, a ring member for holding the bushing, and means for holding said ring member, said means being adapted to be swung out of operative position and thereby remove the ring member and the bushing from the spout.

4. A device for holding a delivery bushing for a glass delivering spout comprising a member hinged to said spout, and a member forming a slidable connection with said hinged member for retaining said bushing.

5. In combination with a spout having a discharge outlet for delivering viscous glass, an orifice bushing, and a detachable carrier provided with a flange for holding the bushing in position beneath the outlet, the walls of said flange being adapted to grip the bushing and cause the same to be pulled away from the outlet when the carrier is detached from the spout.

6. In combination with a spout having a discharge outlet for delivering viscous glass, an orifice bushing, a ring member for mounting the bushing, a carrier provided with a socket for holding the ring member and the bushing in position beneath the outlet, the walls of said socket being adapted to grip the ring member and thereby remove the bushing from the outlet when the carrier is removed from the spout.

In testimony whereof we hereby affix our signatures.

OLIVER M. TUCKER.
WILLIAM A. REEVES.